United States Patent [19]

Jones

[11] 4,002,593
[45] Jan. 11, 1977

[54] PROCESS FOR PRODUCING DISPERSIONS OF PIGMENTS IN CONDENSATION TYPE POLYMERS

[75] Inventor: Marlene J. Jones, Wilmington, Del.

[73] Assignee: Hercules Incorporated, Wilmington, Del.

[22] Filed: July 17, 1975

[21] Appl. No.: 596,927

[52] U.S. Cl. .............................. 260/40 P; 260/37 P; 260/37 NP
[51] Int. Cl.$^2$ ................... C08K 9/04; C09D 17/00
[58] Field of Search ............ 260/37 P, 37 NP, 40 P

[56] References Cited
UNITED STATES PATENTS

| | | | |
|---|---|---|---|
| 1,863,332 | 6/1932 | Hailwood et al. | 260/37 P |
| 2,070,177 | 2/1937 | Pickett | 260/37 P |
| 2,571,319 | /0000 | Waters et al. | 260/40 P X |
| 2,884,410 | 4/1959 | Randall | 260/37 NP X |
| 3,275,590 | 9/1966 | Thomas | 260/40 P |

Primary Examiner—Donald E. Czaja
Assistant Examiner—S. M. Person
Attorney, Agent, or Firm—Hazel L. Deming

[57] ABSTRACT

A process for producing essentially agglomerate free intimate dispersions of at least 10 weight % of pigment in condensation type polymers is described. The process is carried out by forming a liquid dispersion of pigment particles having a size less than 3 microns in certain hydrocarbon diluents, adding the liquid dispersion to a melt of the polymer, mixing the dispersion and polymer under molten conditions until the pigment transfers from the diluent phase to the polymer phase, removing the diluent phase and recovering the pigment-polymer phase.

10 Claims, No Drawings

PROCESS FOR PRODUCING DISPERSIONS OF PIGMENTS IN CONDENSATION TYPE POLYMERS

This invention relates to a process for producing pigment dispersions suitable for use in coloring fiber and film-forming polymers and more particularly to a process for producing essentially agglomerate free intimate dispersions of pigment in condensation type polymers.

One of the major problems encountered in the direct pigmentation of condensation type polymers such as the polyesters, polyamides and polyesteramides is that uniform blending of the pigment cannot be easily obtained due to the thermal and hydrolytic instability characteristics of the polymers. Conventional blending techniques such as, for example, hot roll milling do not provide uniform dispersions with these polymers. Prolonging the milling time to afford better dispersion or increasing the milling temperature to reduce the melt viscosity causes excessive polymer degradation or prohibitive discoloration and is not practical for polyesters. Additionally, any moisture carried by the pigment particles or the polymer tends to cause serious degradation at elevated temperatures.

Various methods have been proposed to overcome the dispersion difficulties with polyesters. One such method involves introducing the pigment into the polyester monomer during the polycondensation reaction. The choice and amount of pigments which can be utilized in this manner are limited to those pigments having sufficient thermal resistance to prolonged exposure under condensation conditions and having no adverse affect on the condensation reaction. Consequently, a wide variety of colors and shades is not possible. Additionally, the degree of dispersion is not sufficiently complete to provide trouble free melt spinning into fiber, and the pigmented fibers are inferior in that they cannot be drawn successfully into fine deniers, have low tenacities and possess poor color depth.

Another method which has been proposed for pigmenting polyesters comprises dispersing the pigment in a solution of a polyester in a volatile organic solvent and then vaporizing the solvent from the solution to provide a concentrate which can be let down with the same or a different polyester. Alternatively, the solution of polyester containing pigment can be used to coat chips of a high melting polyester which is not soluble in the solvent and the solvent removed by evaporation. Organic solvents which are volatile, good solvents for polyesters and useful in this solution technique are the halogen-containing hydrocarbons such as methylene chloride, tetrachloroethane, chlorobenzene and the like or mixtures thereof with alcohols such as isopropyl alcohol, glycol monoethyl ether, phenol and the like. The use of chlorinated solvents is not only undesirable from the standpoint of toxicity and expense, but is impractical with such organic pigments as the phthalocyanine blues due to the recrystallizing effect of the solvent on the pigment. Additionally, very high shear must be used to break up aggregates and agglomerates which form. The production of an essentially agglomerate free pigment dispersion is not possible by the solution technique.

Another method for forming pigment concentrates suitable for let down with the high melting polyesters comprises intimately mixing the pigment with certain polyesters type carriers which are lower melting or more easily processed than the let down polymer and serve as carrier resins for the pigment. Suggested carriers of this type are the low molecular weight linear aliphatic polyesters having melting points not greater than 150° C. and melt viscosities not greater than 20 poises at 150° C.; certain copolyesters having melting points between 150° and 240° C. and inherent viscosities of at least 0.5; amorphous polyesters; and diglycol terephthalate or oligomers of terephthalic acid and ethylene alycol. Vigorous grinding, however, is necessary to disperse the pigment in a solution or melt of the carrier and the pigment dispersions produced in this manner, although improved over those from the higher melting polyesters, still do not provide the high degree of dispersibility required for trouble free spinning into fiber.

A further method which has been proposed for pigmenting polyesters comprises thoroughly mixing the pigment with finely divided polyesters which have been treated in a certain manner to improve surface receptivity. Such polyesters are those which have been mechanically comminuted to provide a roughened and fissured surface and/or have an apparent density not greater than 0.3 gm./ml. The latter polyesters are prepared by abrasively scraping chips of the polyester or by spray drying a solution of the polyester. Control of the size of the pigment particles in such polyesters is difficult and the requirement that the polyester be processed to a certain form detracts considerably from any advantages in dispersibility which might otherwise be achieved.

Now in accordance with this invention it has been found that pigments can be dispersed in condensation type polymers to give intimate dispersions which are essentially agglomerate free at relatively high pigment concentrations without extensive grinding or working of the polymer and pigment under conditions which normally lead to degradation of such polymers. Accordingly, the present invention relates to a process for producing an essentially agglomerate-free intimate dispersion of at least 10% by weight of pigment in a thermoplastic linear condensation type polymer, which process comprises the steps of (a) forming a liquid pigment dispersion of pigment particles having a size less than 3 microns in a normally liquid hydrocarbon diluent which is an nonsolvent for the pigment and the polymer and is volatile at a temperature which is at least as high as the softening point of the polymer; (b) introducing a sufficient amount of the liquid pigment dispersion into a melt of the polymer to provide at least 10% of pigment by weight of the pigment plus polymer; (c) mixing the liquid pigment dispersion with the polymer while it is in the molten state until the pigment has transferred from the diluent phase to the polymer phase; (d) removing the diluent phase; and (e) recovering the pigment polymer phase.

The process of this invention, as stated, involves in step (a) forming a liquid dispersion of pigment particles having a size less than 3 microns in a normally liquid hydrocarbon diluent which is a non-solvent for the pigment and the condensation type polymer and is volatile at or above the softening point of the polymer. Liquid pigment dispersions having the pigment particles in a desired size range can be formed in any convenient manner for intimately associating a finely divided solid with a liquid. Conventional techniques such as pebble milling, grinding in a colloid mill, ball milling or the like are suitable and provide dispersions wherein the particles are less than 3 microns and most of the particles are less than 1 micron in size. A particularly convenient method is to grind a mixture of the dry pigment and diluent in a sand mill or perl mill until a free-flowing dispersion of pigment in the desired particle size range is formed.

The pigments which can be dispersed in the diluent are any of the solid colorants normally used in the industry for the coloring, opacifying, delustering or otherwise modifying the color of plastics. These include the inorganic and organic prime pigments, extender pigments, metallic pigments, the various finely divided channel and furnace blacks and the like. Typical pigments include organic pigments such as diarylide yellows, the phthalocyanine blues and greens, the quinacridone reds and violets, dioxazine violet, and the like; and inorganic pigments such as the cadmium reds and yellows, the cadmium sulfide type pigments, the molybdate oranges, iron oxide yellow, red, brown and black, and the like. Also suitable are the hydrophilic type pigments such as, for example, titanium dioxide and the lead chromate colors.

Because some of the pigments and particularly the carbon black pigments are more resistant to incorporation into plastics than others, it is usually desirable to include a small amount of an oil-soluble surfactant in the dispersing stage to improve hydrophobicity and facilitate grinding. The surfactant is usually added along with the diluent but can be added at any time during the formation of the dispersion. By the term "surfactant" is meant an agent which modifies the properties of a liquid medium at a surface or interface, usually by reducing surface tension or interfacial tension.

The presence of a surfactant is optional but usually desirable to aid in pigment wetting at this stage and to facilitate transfer of the pigment to the polymer phase at a later stage. The oil-soluble surfactants which are useful can be cationic, anionic or nonionic, will have sufficient heat stability to withstand subsequent processing temperatures without decomposition and should be non-reactive with any of the resinous components of the concentrate or polymers with which the concentrate is to be used. Cationic surfactants which are suitable include primary, secondary and tertiary amines, or quaternary ammonium compounds. Tertiary amines properly substituted to fill the above requirements are very satisfactory. Preferred compounds of this type for use herein are the heterocyclic tertiary amines. These amines exhibit excellent wetting power and solubility in hydrocarbon solvents, have good heat stability and low water solubility. The chain length of the substituted alkyl group is critical only as it affects the solubility and effectiveness of the salt as wetting agent. In general, alkyl chain lengths from about 7 carbon atoms to about 19 carbon atoms are operative. Preferred length of the alkyl chain is from about 11 to about 17 carbon atoms. Typical of the heterocyclic tertiary amines are the alkyl imidazolines and oxazolines. One of the preferred imidazolines is 1-(2-hydroxyethyl)-2-n-heptadecenyl-2-imidazoline.

Other substituted tertiary amines which can be used are polyethoxylated amines having the following structural formula:

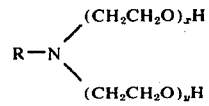

where R is an organic radical, i.e., a fatty acid radical containing from about 12 to about 20 carbon atoms, and x and y are integers whose sum may vary from 2 to about 6 or 7 as long as the free base is water-insoluble.

Suitable primary amines include dehydroabietylamine which has the following structural formula:

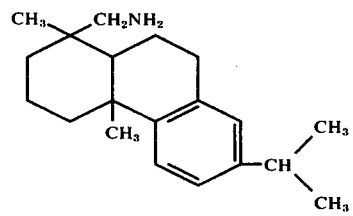

and fatty acid primary amines wherein the fatty acid group preferably contains from about 12 to about 20 carbon atoms.

Typical of the quaternary ammonium compounds suitable for use herein are the quaternary ammonium chlorides derived from adducts of $C_{12}$ to $C_{18}$ fatty acid amines and from about 2 to about 15 moles of ethylene oxide, e.g., Ethoquad C12, a quaternary ammonium chloride derived from the adduct of coconut oil fatty acid amine and two moles of ethylene oxide. Other suitable quaternary compounds include those containing a cyclic or aromatic structure such as lauryl pyridinium chloride and lauryl imidazolinium chloride. Such compounds appear to have better heat stability than quaternary compounds composed of alkyl groups alone.

Anionic surfactants which have sufficient heat stability for subsequent plastic processing, and which are oil-soluble are also suitable. Typical anionic surfactants include sodium oleate, sodium laurate, sodium palmitate, sodium stearate, sodium naphthenate, sulfonated castor oil, sulfonated petroleum, sulfonated tall oil and the like. Other anionic materials which are suitable for this purpose are the sodium sulfonates of the condensation products of alkylphenols and up to 5 moles of ethylene oxide, e.g., the sodium sulfonate of the condensation product of nonylphenol and 5 moles of ethylene oxide. Additional examples of anionic surfactants are Tergitol 4 (the sodium sulfate derivative of 7-ethyl-2-methyl-4-undecanol), Igepon AC-78 (the coconut oil acid ester of sodium isethionate), Triton GR-5 and Triton X-200 (dioctyl sodium sulfosuccinate and a product having the formula R-$C_6H_4OC_2H_4OC_2H_4SO_3Na$ where R is an octyl or nonyl group, respectively,) Protenol NT (triethanolamine salt of n-acylated polypeptide), Maypon 4C Spec. (the potassium salt of the peptide of coconut oil fatty amine condensate), Sarkosyl NL (sodium N-lauroyl sarcosinate), Duponol WAT (triethanol ammonium lauryl sulfate), Emcol P1059 (the amine salt of dodecyl benzene sulfonic acid), Aerosol 22 (tetrasodium-N-(1,2-dicarboxyethyl)-N-octadodecyl sulfosuccinamate), Igepon TC-42 (sodium-N-methyl-N tall oil acid taurate), and Decerosol OS (the dioctyl ester of sodium sulfosuccinic acid).

The nonionic surfactants which have been found to be particularly useful generally have an HLB greater than 11 and preferably from about 12 to about 18 and are the types known as polyether alcohols, alkylene oxide-alkylene diamine block polymers, polyoxyethylene glycol or glycerol esters and polyvinyl pyrrolidone. Preferred nonionic surfactants of the polyether alcohol type are the condensates of ethylene oxide and an alcohol such as a rosin alcohol or an alkyl phenol. Particularly preferred are the alkylaryl polyether alcohols which contain an average of 9 to 40 moles of ethylene oxide per mole of alcohol and contain alkyl groups of 8 to 9 carbon atoms. The polyether alcohol type surfactants are commercially available as the Tritons, e.g., X-100, X-102, N-101 and N-111, the Igepals, the Hyonics and the Tergitols. Typical of the alkylene oxide-alkylene diamine block polymer type surfactants are the materials formed by the addition of an alkylene oxide to an alkylene diamine, as for example by the addition of propylene oxide to ethylene diamine followed by the addition of ethylene oxide. Surfactants of this type are commercially available as the Tetronics. Nonionic surfactants of the polyoxyethylene glycol or glycerol ester type include the ethoxylated fatty and rosin acid esters such as the polyethylene glycol fatty and/or rosin acid esters and the polyoxyethylene fatty glycerides containing at least 10 moles of ethylene oxide per mole of such acids as coconut fatty acid, stearic acid, oleic acid and rosin/fatty acid combinations. Surfactants of this type are commercially available as the Ethofats and Atlas G-1295 and G-1300. Nonionic surfactants of the polyvinyl pyrrolidone type are available commercially as the Ganex's, e.g., Ganex V216, V220 and V516.

The choice and amount of surfactant will, of course, vary depending upon a number of factors which include the type of pigment, the HLB value of the surfactant and the particular diluent employed. More than one surfactant of a given type or combinations of different types can, of course, be used, as desired. Generally, the amount of surfactant will depend upon the type of pigment and its surface area. Usually, inorganic pigments such as cadmium sulfide yellow or titanium dioxide white which have average particle sizes within the range of from about 0.1 micron to about 2.0 microns require only a small amount of surfactant. On the other hand, organic pigments which have a much higher surface area require larger proportions of surfactant. Usually, if present, the amount of surfactant will range from about 0.5 to about 10% based on the weight of the pigment.

The diluent which is used to form the liquid pigment dispersion is, as stated, a normally liquid hydrocarbon which is a non-solvent for the pigment and the condensation type polymer and is volatile at a temperature which is at least as high as the softening point of the polymer. Preferred diluents of this type include the aliphatic and aromatic hydrocarbons having a boiling point above the softening point of the polymer, and most preferably between about 63° and about 205° C. Typical diluents which can be used in the process of the invention include the aliphatic hydrocarbons containing about 5 to about 10 carbon atoms and particularly paraffinic hydrocarbon mixtures, the aromatic hydrocarbons such as benzene, toluene, ethyl benzene, xylene, exylene, and the like. Mixtures of any of the above diluents can be used.

The amount of diluent used is not critical and is largely a matter of choice and convenience, the practical requirement being that sufficient diluent is present to permit adequate dispersion of the pigment. Generally, the ratio of diluent to pigment will range from about 9:1 to about 1:1 and preferably from about 2:1 to about 1:1. Amounts of diluent above about 9:1 are not harmful but usually impractical due to the expense and time involved to remove and recover the organic diluent.

Following formation of the liquid pigment dispersion, the dispersion is introduced into a melt of the condensation type polymer. This step of the process can be carried out in any suitable apparatus such as an agitated tank fitted with suitable heating means, vacuum line(s), inlet port(s), etc. Powdered, flake, pelletized, lump or molten polymer is added to the tank and heated, if necessary, to bring the polymer to a point of fluidity, at which time agitation is commenced. The liquid pigment dispersion in the desired amount is added to and mixed with the polymer under molten conditions and agitation is continued until the pigment is transferred from the diluent phase to the polymer phase. High shear agitation is neither necessary nor desirable and the only requirement is that sufficient agitation be employed to assure adequate contact of the pigment and polymer. The temperature of the molten polymer is not critical but should be maintained as low as possible to avoid degradation. Usually the temperature will range from about 5° c. to about 25° C. above the melting point of the polymer. A preferred temperature range for ideal conditions is from about 100° C. to about 150° C. After a few minutes' stirring, a homogeneous fluid mixture is obtained and stirring is continued until the pigment is transferred to the polymer phase. Transfer of the pigment particles from the diluent phase to the polymer phase occurs readily during mixing and is complete when the mixture separates into two distinct phases comprising a colorless diluent phase and a colored polymer phase. Preferably, the colorless diluent phase is removed incrementally, as by decantation, or continuously, as by distillation, in order to minimize the amount of diluent present at a given time. A particularly suitable manner for carrying out these steps of the process is to meter the dispersion into the polymer below its surface and to maintain the molten polymer under sufficient vacuum to strip off the diluent during mixing at about the same rate as the dispersion is introduced.

Following removal of the diluent, the pigment polymer phase is recovered conventionally as by cooling in air. The cooled mixture can be used as such but is generally pulverized to pass through a 10 mesh screen.

The linear thermoplastic condensation type polymers which are used to form the pigment dispersions of this invention are preferably polyesters, polyamides or polyesteramides. The thermoplastic linear polyesters are homopolyesters, copolyesters or terpolyesters comprising a series of predominantly carbon atom chains joined by recurring carbonyloxy radicals

Included, for example, are the polyesters disclosed in U.S. Pat. Nos. 2,465,319; 2,901,466; and 3,018,272.

Preferred are the polyesters having a softening point of at least about 65° C. and most preferably above about 70° C., and an intrinsic viscosity of at least about 0.05 and preferably at least about 0.08 prepared from dicarboxylic acids or ester-forming derivatives thereof and glycols, for example, poly(ethylene terephthalate), poly(propylene terephthalate), poly(tetramethylene terephthalate), poly (2,2-dimethyl-1,3-propylene terephthalate), (cyclohexanedimethanol terephthalate), and poly(ethylene bibenzoate). Typical dicarboxylic acids include the aromatic dicarboxylic acids such as phthalic acid, isophthalic acid and terephthalic acid and typical glycols include ethylene glycol, propylene glycol, hexamethylene glycol, 1,4-cyclohexane dimethanol and the like. Particularly preferred are the low molecular weight linear copolyesters of ethylene glycol, an aliphatic or cycloaliphatic diol and a difunctional dicarboxylic acid or its ester. Copolyesters of this type are known and available commercially. The copolyesters preferably have an intrinsic viscosity above about 0.05 and most preferably from about 0.08 to 0.8, softening points (Fisher Johns) of at least about 65° C. and most preferably above about 70° C. and melting points (Fisher Johns) ranging from about 85° C. to about 200° C. Particularly preferred are the copolyesters of at least one difunctional dicarboxylic acid or its ester and an alcohol function comprising from about 50 to 100 mole percent of ethylene glycol and from 0 to about 50 mole percent of at least one diol selected from the group consisting of aliphatic diols having 4 to 10 carbon atoms. Examples of aliphatic diols include 1,4-butanediol; diethylene glycol; 2,2,4-trimethyl-1,3-pentanediol; 2,2-dimethyl-1,3-propanediol; 2-ethyl-2-butyl-1,3-propanediol; 1,5-pentanediol; 1,6-hexanediol; 1,7-heptanediol; 1,8-octanediol; 1,9-nonanediol; and 1,10-decanediol and examples of cycloaliphatic diols include 1,3-cyclobutanediol; 2,2,4-tetramethyl-1,3cyclobutanediol; 1,2-cyclohexanedimethanol; 1,3-cyclohexanedimethanol; 1,4-cyclohexanedimethanol; 1,5-cyclooctanediol; and 1,6-cyclodecanediol.

Suitable difunctional dicarboxylic acids include oxalic; malonic; dimethylmalonic; succinic; glutaric; adipic; pimelic; azelaic; sebacic; 1,3-cyclopentane dicarboxylic; 1,2-cyclohexane dicarboxylic 1,3-cyclohexane dicarboxylic; 1,4-cyclohexane dicarboxylic; phthalic; isophthalic; terephthalic; 2,5-norbornane dicarboxylic; 1,4-naphthalic; t-butyl-isophthalic; diphenic; 4,4'-sulfonyldibenzoic; 4,4'-oxydibenzoic; 2,5-naphthalene dicarboxylic; 2,6-naphthalene dicarboxylic; and 2,7-naphthalene dicarboxylic acids. Ester-forming derivatives of these acids are also useful and include dimethyl-1,4-cyclohexanedicarboxylate; dimethyl-2,6-naphthalenedicarboxylate; dimethyl-4,4'-sulfonyldibenzoate; dimethyl isophthalate; dimethyl terephthalate; and diphenyl terephthalate. Two or more of the above acids or ester-forming derivatives thereof may be used in preparing the copolyester.

The thermoplastic linear polyamides are homopolyamides or copolyamides prepared by the polymerization of diamines and dibasic acids or polyamide-forming functional derivatives of these acids. As examples of suitable diamines may be listed the straight chain polymethylene aliphatic diamines of the general formula $H_2N(CH_2)_nNH_2$, where n is not less than 4 and not greater than 20, branched chain aliphatic diamines, for example, 2,2,4-trimethyl hexamethylene diamine; ether diamines, for example, 3,3'-bis(aminopropyl)ether, ethylene bis(3-aminopropyl)ether; cycloaliphatic diamines, for example 1,4-bis(aminomethyl) cyclohexane, bis(4-aminocyclohexyl) methane; aryl aliphatic diamines, for example, m-xylylene diamine, p-xylylene diamine; and heterocyclic diamines, for example, piperazine. The above diamines may be condensed singly or in various combinations as appropriate and familiar to those skilled in the art with functional derivatives of oxalic acid; with straight chain polymethylene dicarboxylic acids (or their polyamide-forming function derivatives) of the general formula $HOOC(CH_2)_mCOOH$, where m is not less than 4 and not greater than 20; with branched chain aliphatic dicarboxylic acids, for example, 2-methyl butane 1,4-dicarboxylic acid; with cycloaliphatic dicarboxylic acids, for example, cyclohexane 1,4-dicarboxylic acid; with aromatic dicarboxylic acids, for example, terephthalic acid, isophthalic acid, 2,5-dimethyl terephthalic acid, naphthalene 1,4-dicarboxylic acid, and benzophenone 2,4'-dicarboxylic acid; with arylaliphatic dicarboxylic acids, for example, 2,5-dimethyl p-phenylene diacetic acid, 2,2-bis[p-carboxymethoxy phenyl]propane and bis[p-carboxy-methyl phenyl] ether; and with heterocyclic dicarboxylic acids, for example, furan 2,5-di -($\beta$-propionic acid). Mixtures of these acids may be used to prepare copolyamides. Polyamides and copolyamides may also be prepared from $\omega$-amino-acids or the derived cyclic lactams, used either alone or in combination with the above diacids and diamines in appropriate stoichiometric balance. For example, $\epsilon$-aminocaproic acid, caprolactam, $\omega$-aminoundecanoic $\omega$-aminododecanoic acid, 7-heptanolactam and 8-octanolactam. The preferred polyamides have softening points above about 100° C. and an intrinsic viscosity of at least about 0.2 and preferably at least about 0.4. Particularly suitable are the polyamides available commercially under the designation Nylon 11 and Nylon 12.

The thermoplastic linear polyesteramides are the condensation polymers containing molecules having blocks or random mixtures of ester and amide linkages. The polyesteramides are well known and are derived from dicarboxylic acids or ester-forming derivatives thereof, diols and diamines. Included, for example, are the polyesteramides described in U.S. Pat. No. 2,547,113 and other similar prior art, as for example, Carothers, J. Am. Chem. Soc. 54, 1566 (1932). Preferred are the polyesteramides having a softening point above about 100° C. and an intrinsic viscosity of at least about 0.5 and most preferably at least about 0.7 prepared from at least one aliphatic or aromatic dicarboxylic acid such as malonic acid, adipic acid, azelaic acid, sebacic acid, phthalic acid, isophthalic acid and terephthalic acid or the ester-forming derivatives of these acids such as dimethyl azelate, dimethyl sebacate, dimethyl isophthalate, dimethyl terephthalate, diphenyl terephthalate, and the like; glycols such as ethylene glycol, propylene gylcol, neopentyl glycol, and cyclohexanedimethanol; and diamines such as hexamethylenediamine, ethylenediamine, p-xylylene-$\alpha,\alpha'$-diamine, and the like.

Other ingredients such as heat and light stabilizers, antioxidants, antistatic agents, viscosity improvers, mold release agents, flame retardants, fillers, extenders and the like can also be present in the pigmented compositions of the invention in amounts which do not detract from the advantages of the invention. Such ingredients can be incorporated as an additive to the liquid pigment dispersion or to the molten polymer. Usually, the amount of such additives which are not pigmentary or of the filler type will not exceed about 1 or 2 percent by weight of the total composition.

The pigment-polymer dispersions of the present invention are concentrates which contain at least 10% by weight of pigment and generally from about 20 to about 50% by weighht of pigment when an inorganic pigment is used and from about 20 to about 35% by weight of pigment when an organic pigment is used. The concentrates are useful for coloring a wide variety of plastics and are particularly useful for let down with fiber-forming linear condensation polymers such as the polyesters and polyamides. Blending of the pigment concentrate with non-pigmented polymer can be carried out in any convenient manner for intimately mixing two thermoplastic materials. A particularly convenient method is to add the concentrate and polymer to an extruder with a suitable mixing screw. Similar results can be obtained by mixing molten streams of the polymer and concentrate by means of a metering pump and extruding the mixture through a suitable die.

Having described the invention generally, the following examples are given to illustrate specific embodiments thereof. All parts and percentages are by weight unless otherwise indicated.

EXAMPLE 1

A pigment dispersion was prepared by agitating 150 parts of α-copper phthalocyanine blue pigment, 300 parts of Isopar H (a paraffinic hydrocarbon diluent having a boiling range of 162°–177° C.), 6 parts of a nonionic surfactant of the polyvinyl pyrrolidone type and 450 parts of sand (particle size range of 0.3–0.6 mm.) for 20 hours at room temperature and then filtering the dispersion to remove the sand. The resulting dispersion which contained 28.6% (by analysis) of the pigment as particles having an average size of 2 microns was diluted to 13.5% solids with Isopar H.

A closed vessel equipped with agitator, heating means, inlet tube, vacuum tube and liquid trap was charged with 105 parts of a copolyester having an intrinsic viscosity of 0.13, a ring and a ball softening point of 84° C. and a melt viscosity of 340 poises at 121° C. and the charge was heated to the melt. The copolyester used in this example was prepared from a mixture containing by weight 55.3% of a dimethyl terephthalate production by-product, 29.3% of ethylene glycol and 15.4% of cyclohexanedimethanol, the by-product analyzing 38.8% of dimethyl terephthalate, 41.9% of dimethyl iso- and ortho-phthalates, 5.5% of methyl dimethyl phthalates, 2.9% of monoethyl terephthalate, 1% of methyl p-toluate, 5.2% of p-toluic acid and 4.7% of 4-carbomethoxybenzaldehyde. Agitation of the charge was commenced and 200 parts of the diluted pigment dispersion prepared above was introduced below the surface of the agitated molten copolyester charge in 20 part portions over a period of 1½ hours, a slight vacuum (about 80 mm. Hg) being employed to strip off the diluent. When the diluent ceased to distill from the mixture (about 30 minutes after introduction of all of the dispersion), the molten mixture was removed from the vessel, the mixture was cooled in air and the cooled mixture was pulverized. The product was a uniformly colored pigment concentrate containing 25% of the pigment finely dispersed in the copolyester. The average size of the pigment particles in the concentrate was 2 microns.

22.1 Parts of the above pigment concentrate were dry blended with 1082 parts of ground poly (ethylene terephthalate) having an intrinsic viscosity of 0.6 and a melting point of 260° C., the blend was spun at 284° C. into 585/35 denier filament bundles at the rate of 590 meters/minutes using a 35 hole, 0.016 diameter spinerette die and the resulting filaments were drawn at a draw ratio of 4/1. Spinning performance was excellent and the fibers had a tenacity of 3.7 grams/denier, an elongation of 31%, a modulus of 74 grams/denier and an intrinsic viscosity of 0.515. The maximum draw ratio at break was 6.0 and the maximum operating draw ratio was 5.1. Control fibers produced in the same manner from poly(ethylene terephthalate) which was not blended with the pigment concentrate gave clear fibers having a tenacity of 0.4 grams/denier, and elongation of 25%, a modulus of 82 grams/denier and an intrinsic viscosity of 0.595. The maximum draw ratio at break was 5.85 and the maximum operating draw ratio was 4.95.

When yarn of the colored filaments was subjected to a texturizing test which simulates performance on an industrial scale, the yarn passed the test and there was no evidence of exudation or mark-off on any of the metal surfaces of the equipment. The texturizing test of this example was carried out by transporting a strand from a fixed bobbin of yarn at constant tension at a rate of 250 feet/minute through a 1 meter bar heating unit at 210°–215° C., through the eyelet (pigtail guide) on a spindle pin revolving at 250,000 r.p.m. and onto a winder. The test was run for 1 hour, after which time any build-up of pigment was observed on the eyelet, and the yarn was considered to fail the texturizing test if an observable amount of pigment was evident.

EXAMPLE 2

The procedure of Example 1 was repeated except that the pigment dispersion was prepared by agitating 150 parts of α-copper phthalocyanine blue pigment, 300 parts of Isopar H, 150 parts of n-heptane, 6 parts of the nonionic surfactant of Example 1 and 450 parts of sand for 20 hours at 125° C. (at which time substantially all of the heptane had been removed by evaporation), and the dispersion was cooled with agitation prior to filtering to remove the sand. The filtered dispersion contained 30% of pigment as particles having an average size of 2 microns. When the liquid dispersion was diluted to 13.5% solids and mixed with the molten copolyester, and the pigment-polymer phase was recovered as in Example 1, the product was a uniformly colored pigment concentrate containing 25% of the pigment finely dispersed in the copolyester. The average particle size of the pigment particles in the concentrate was 2 microns.

When 22.1 parts of the pigment concentrate of this example were dry blended with 1082 parts of clear poly (ethylene terephthalate), spun into fiber and drawn according to the procedure of Example 1, spinning performance was excellent and there was no evidence of exudation or mark-off in the texturizing test.

EXAMPLE 3

The procedure of Example 2 was repeated except that: the liquid pigment dispersion containing particles having a size less than 2 microns was prepared from 200 parts of carbon black (Regal 660), 800 parts of Isopar H, 400 parts of n-heptane, 8 parts of the nonionic surfactant of Example 1, 8 parts of a tallow primary amine surfactant and 1000 parts of sand; and 105 parts of a copolyester having an intrinsic viscosity of 0.15, a ring and ball softening point of 93° C. and a melt viscosity of 500 poises at 126° C. were substituted for the 105 parts of the copolyester of Example 1. The copolyester used in this example was prepared from a mixture containing 56% of the dimethyl terephthalate production by-product of Example 1, 29% of ethylene glycol and 15% of cyclohexanedimethanol. The product of this example was a uniformly colored pigment concentrate containing 25% of carbon black finely dispersed in the copolyester. The average size of the carbon black particles in the concentrate was 4 microns.

When 104.8 parts of the pigment concentrate of this example were dry blended with 1204 parts of clear poly(ethylene terephthalate), spun into fiber and drawn according to the procedure of Example 1, spinning performance was excellent and there was no evidence of exudation or mark-off in the texturizing test.

EXAMPLE 4

The procedure of Example 3 was repeated except that 120 parts of a copolyester having an intrinsic viscosity of 0.70, a ring and ball softening point of 112° C. and a melt viscosity of 295 poises at 193° C. were substituted for the 105 parts of the copolyester of Example 3. The copolyester used in this example was prepared from a mixture containing 62% of the dimethyl terephthalate production by-product of Example 1, 20.2% of ethylene glycol, 16.1% of neopentyl glycol, 0.5% of dimethylazelate and 1.2% of glycerol. The product of this example was a uniformly colored pigment concentrate containing 22.5% of carbon black finely dispersed in the copolyester. The average size of the carbon black particles in the concentrate was 5 microns.

When 141.6 parts of the pigment concentrate of this example were dry blended with 1167 parts of clear poly (ethylene terephthalate), spun into fiber and drawn according to the procedure of Example 1, spinning performance was excellent and there was no evidence of exudation or mark-off in the texturizing test.

EXAMPLE 5

The general procedure of Example 1 was repeated except that 50 parts of a copolyester having an intrinsic viscosity of 0.09, a ring and ball softening point of 74° C. and a melt viscosity of 430 poises at 99° C. were substituted for the 105 parts of the copolyester of Example 1; the charge was melted in an open vessel; 50 parts of the diluted pigment dispersion were added to the vessel in 10 part increments; after each addition and prior to the next addition, the charge was stirred until the pigment was completely transferred from a Isopar phase to the copolyester phase and the clear supernatant Isopar H which separated therefrom was decanted; and following pulverization, the concentrate was dried in an oven at 50° C. under vacuum for 24 hours. The copolyester used in this example was prepared from a mixture containing 56% of the dimethyl terephthalate production by-product of Example 1 and 44% of ethylene glycol. The product of this example was a uniformly colored concentrate containing 12% of the pigment finely dispersed in the copolyester. The average size of the pigment particles was less than 3 microns and the concentrate contained few pigment particles greater than 5 microns in size.

When 36.8 parts of the pigment concentrate of this example were dry blended with 1067 parts of clear poly(ethylene terephthalate), spun into fiber and drawn according to the procedure of Example 1, spinning performance was excellent and there was no evidence of exudation or mark-off in the texturizing test.

EXAMPLE 6

The procedure of Example 1 was repeated except that 300 parts of Solvesso 150 (an essentially aromatic hydrocarbon diluent having a boiling range of 173°–195° C.) was substituted for the 300 parts of Isopar H; 105 parts of a polyesteramide having an intrinsic viscosity of 0.88, a ring and ball softening point of 108° C. and a melt viscosity of 450 poises at 182° C. was substituted for the 105 parts of the copolyester of Example 1; and 194.5 parts of the diluted pigment dispersion were used. The average size of the pigment particles in the diluted dispersion was 2 microns. The polyesteramide used in this example was prepared from a mixtue of 41% of the dimethyl terephthalate production by-product of Example 1, 27% of ethylene glycol, 17% of neopentyl glycol, 11.5% of dimethylazelate and 4% of hexamethylenediamine. The product of this example was a uniformly colored concentrate containing 20% of the pigment finely dispersed in the polyesteramide. The average size of the pigment particles in the concentrate was less than 5 microns.

When 131 parts of the pigment concentrate were dry blended with 1178 parts of clear poly(ethylene terephthalate, spun into fiber and drawn according to the general procedure of Example 1, spinning preformance was excellent and there was no evidence of exudation or mark-off in the texturizing test. Similar results were obtained when the concentrate was dry blended with Nylon 6, spun into fiber, drawn and texturized, as above.

EXAMPLE 7

The procedure of Example 6 was repeated except that 105 parts of a polyamide (Nylon 12) having an intrinsic viscosity of 0.35, a number average molecular weight of 4500, a melting point of 178° C. and a ring and ball softening point of 150° C. were substituted for the 105 parts of the polyesteramide and 106 parts of the diluted pigment dispersion were used. The product of this example was a uniformly colored pigment concentrate containing 12% of the pigment finely dispersed in the nylon. The average size of the pigment particles in the concentrate was less than 5 microns.

When 175 parts of the pigment concentrate were dry blended with 1134 parts of Nylon 6, spun into fiber and drawn according to the general procedure of Example 1, spinning performanace was excellent and there was no evidence of exudation or mark-off in the texturizing test.

What I claim and desire to secure by Letters Patent is:

1. A process for producing an essentially agglomerate-free intimate pigment dispersion for use in coloring fiber and filmforming polymers, said dispersion consisting essentially of at least 10% by weight of pigment in a thermoplastic linear condensation type polymer, which process comprises the steps of
    a. forming a liquid pigment dispersion of pigment particles having a size less than 3 microns in a normally liquid aliphatic or aromatic hydrocarbon diluent which is a nonsolvent for the pigment and for said polymer and is volatile at a temperature which is at least as high as the softening point of said polymer;
b. introducing a sufficient amount of said liquid pigment dispersion into a melt of said polymer to provide at least 10% of pigment by weight of the pigment plus polymer;
c. mixing said liquid pigment dispersion with said polymer while it is in the molten state until the pigment has transferred from the diluent phase to the polymer phase;
d. removing the diluent phase; and
e. recovering the pigment polymer phase.

2. The process of claim 1 wherein the liquid pigment dispersion is continuously introduced below the surface of the melt and the diluent phase is removed continuously by evaporation.

3. The process of claim 2 wherein the condensation type polymer is a polyester.

4. The process of claim 3 wherein the polyester is a copolyester from ethylene glycol, at least one aliphatic or cycloaliphatic diol having 4 to 10 carbon atoms and at least one difunctional dicarboxylic acid or ester.

5. The process of claim 4 wherein the diol is cyclohexane dimethanol and the dicarboxylic acid or ester is an aromatic acid or ester.

6. The process of claim 5 wherein the aromatic ester is dimethyl terephthalate.

7. The process of claim 2 wherein the condensation type polymer is a polyamide.

8. The process of claim 2 wherein the mixing is carried out under vacuum.

9. The process of claim 1 wherein the introduction of the liquid pigment dispersion is carried out incrementally and the diluent phase is removed incrementally.

10. The process of claim 9 wherein the diluent phase is removed by decantation.

* * * * *